United States Patent
Nam et al.

(10) Patent No.: US 12,542,269 B2
(45) Date of Patent: Feb. 3, 2026

(54) METHOD OF MANUFACTURING ANODE FOR LITHIUM SECONDARY BATTERY INCLUDING PRE-LITIGATION

(71) Applicants: HYUNDAI MOTOR COMPANY, Seoul (KR); KIA CORPORATION, Seoul (KR); Korea Institute of Science and Technology, Seoul (KR)

(72) Inventors: Young Jin Nam, Suwon-si (KR); Dae Yang Oh, Hwaseong-si (KR); Soon Chul Byun, Yongin-si (KR); Jae Min Lim, Suwon-si (KR); Hong Suk Choi, Hwaseong-si (KR); Min Ah Lee, Seoul (KR); Ji Hyun Hong, Seoul (KR); In Yeong Kang, Seoul (KR); Ju Young Jang, Seoul (KR)

(73) Assignees: Hyundai Motor Company, Seoul (KR); Kia Corporation, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 545 days.

(21) Appl. No.: 17/992,250

(22) Filed: Nov. 22, 2022

(65) Prior Publication Data

US 2023/0275207 A1    Aug. 31, 2023

(30) Foreign Application Priority Data

Feb. 28, 2022   (KR) .................. 10-2022-0025665

(51) Int. Cl.
    *H01M 4/00*       (2006.01)
    *H01M 4/04*       (2006.01)
    *H01M 4/133*      (2010.01)
    *H01M 4/134*      (2010.01)
    *H01M 4/1393*     (2010.01)
    *H01M 4/1395*     (2010.01)
    *H01M 4/38*       (2006.01)
    *H01M 4/587*      (2010.01)
    *H01M 4/02*       (2006.01)

(52) U.S. Cl.
    CPC ......... *H01M 4/0459* (2013.01); *H01M 4/044* (2013.01); *H01M 4/133* (2013.01); *H01M 4/134* (2013.01); *H01M 4/1393* (2013.01); *H01M 4/1395* (2013.01); *H01M 4/38* (2013.01); *H01M 4/587* (2013.01); *H01M 2004/021* (2013.01); *H01M 2004/027* (2013.01)

(58) Field of Classification Search
    CPC ...... H01M 4/04; H01M 4/1393; H01M 4/133; H01M 4/134; H01M 4/1395; H01M 4/587; H01M 4/38
    See application file for complete search history.

(56) References Cited

U.S. PATENT DOCUMENTS

2015/0364795 A1*  12/2015  Stefan ............... H01M 10/0569
                                                      429/188
2021/0104740 A1*   4/2021  Teng ................... H01M 4/1395

* cited by examiner

*Primary Examiner* — Tiffany Legette
*Assistant Examiner* — Monique M Wills
(74) *Attorney, Agent, or Firm* — Morgan Lewis & Bockius LLP (57) ABSTRACT

Proposed is a method of manufacturing an anode for a lithium secondary battery, including a pre-lithiation step.

14 Claims, 6 Drawing Sheets

METHOD OF MANUFACTURING ANODE FOR LITHIUM SECONDARY BATTERY INCLUDING PRE-LITIGATION

CROSS REFERENCE TO RELATED APPLICATION

The present application claims priority to Korean Patent Application No. 10-2022-0025665, filed Feb. 28, 2022, the entire contents of which is incorporated herein for all purposes by this reference.

BACKGROUND OF THE PRESENT DISCLOSURE

Field of the Present Disclosure

The present disclosure relates to a method of manufacturing method an anode for a lithium secondary battery including a pre-lithiation step.

Description of Related Art

An all-solid-state battery is composed of a three-layer laminate in which a cathode disposed on a cathode current collector, an anode disposed on an anode current collector, and a solid electrolyte layer interposed between the cathode and the anode.

An anode including a conventional graphite-based material has theoretical limitations in realizing an all-solid-state battery with high energy density. Therefore, metal materials capable of alloying with lithium, including silicon, are attracting attention as anode materials. However, the new materials also show lower-than-expected energy densities due to their low initial efficiency compared to their high theoretical capacity.

In the conventional anode, dead lithium is formed due to an irreversible reaction during the initial charging process, thereby reducing the capacity of the battery, shortening the lifespan, and lowering the initial efficiency.

Therefore, it is urgently required to develop a technology that can increase the energy density by balancing the electrodes in terms of lithium intercalation and deintercalation.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method for easily prelithiating an anode.

Another objective of the present disclosure is to provide a method capable of stabilizing the surface of a prelithiated anode.

The objective of the present disclosure is not limited to the object mentioned above. The objectives of the present disclosure will become more apparent from the following description and will be realized by means and combinations thereof described in the claims.

The method of manufacturing an anode for a lithium secondary battery, according to an exemplary embodiment of the present disclosure, may include: preparing an anode comprising an anode current collector, and a coating layer disposed on the anode current collector and comprising a carbon material; and immersing the anode in a pre-lithiation solution.

The pre-lithiation solution may include a pre-lithiation compound including lithium and a biphenyl-based compound The lithium doping amount of the anode may be about 1 mAh/cm$^2$ or less.

The coating layer may include the carbon material and a metal capable of alloying with lithium.

The metal capable of alloying with lithium may include at least one selected from the group consisting of silver (Ag), magnesium (Mg), aluminum (Al), gallium (Ga), zinc (Zn), bismuth (Bi), tin (Sn), indium (In), antimony (Sb), lead (Pb), silicon (Si), germanium (Ge), and a combination thereof.

The concentration of the pre-lithiation compound may be about 0.1 M to 1 M.

The molar ratio of the lithium and the biphenyl-based compound may be about 0.5:1 to 6:1.

The biphenyl-based compound may include one represented by the following Formula 1.

[Formula 1]

wherein, in Formula 1, R1 to R10 each may include an alkyl group having 1 to 3 of carbon atoms.

The pre-lithiation solution may further include a solvent, and the solvent may include at least one selected from the group consisting of dimethyl ether (DME), 2-methyl tetrahydrofuran, tetrahydropyranyl, and a combination thereof.

The manufacturing method may be immersing the anode in a pre-lithiation solution at a temperature of about 25° C. to 60° C. for about 10 seconds to 30 minutes.

The manufacturing method may include immersing the anode in the pre-lithiation solution and then immersing the anode in a stabilizing solution.

The stabilizing solution may include at least one selected from the group consisting of fluoroethylene carbonate (FEC), vinylene carbonate (VC), vinyl ethylene carbonate (VEC), methyl vinylene carbonate (meVC), ethylene carbonate (EC), and a combination thereof.

The manufacturing method may be to form a film on the anode by immersing the anode in the stabilizing solution, and the film may include a C—O bond, a C=O bond, and an R—CO—R' bond.

The thickness of the film may be about 200 nm or less.

The manufacturing method may be immersing the anode in the stabilizing solution for about 10 to 60 minutes.

According to an exemplary embodiment of the present disclosure, pre-lithiation can be easily performed by immersing an anode in a highly reducing pre-lithiation solution.

According to an exemplary embodiment of the present disclosure, by immersing the prelithiated anode in a stabilizing solution to stabilize the surface thereof, it is possible to suppress the occurrence of side reactions at the interface of the anode and other components such as the electrolyte.

The effects of the present disclosure are not limited to the effects mentioned above. It should be understood that the effects of the present disclosure include all effects that can be inferred from the following description.

It may be understood that the appended drawings are not necessarily to scale, presenting a somewhat simplified representation of various features illustrative of the basic principles of the present disclosure. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments, it will be understood that the present description is not intended to limit the present disclosure(s) to those exemplary embodiments. On the contrary, the present disclosure(s) is/are intended to cover not only the exemplary embodiments, but also various alternatives, modifications, equivalents and other embodiments, which may be included within the spirit and scope of the present disclosure as defined by the appended claims.

The above objectives, other objectives, features, and advantages of the present disclosure will be easily understood through the following exemplary embodiments in conjunction with the accompanying drawings. However, the present disclosure is not limited to the embodiments described herein and may be embodied in other forms. Rather, the embodiments introduced herein are provided so that the disclosed content may be thorough and complete, and the spirit of the present disclosure may be sufficiently conveyed to those skilled in the art.

Like reference numerals have been used for like elements in describing each figure. In the accompanying drawings, the dimensions of the structures are enlarged than the actual size for clarity of the present disclosure. Terms such as first, second, etc., may be used to describe various elements, but the elements should not be limited by the terms. The above terms are used only for the purpose of distinguishing one component from another. For example, without departing from the scope of the present disclosure, a first component may be referred to as a second component, and similarly, a second component may also be referred to as a first component. The singular expression includes the plural expression unless the context clearly dictates otherwise.

In the present specification, the term "include" or "have" should be understood to designate that one or more of the described features, numbers, steps, operations, components, or a combination thereof exist, and the possibility of addition of one or more other features or numbers, operations, components, or combinations thereof should not be excluded in advance. Also, when a part of a layer, film, region, plate, etc., is said to be "on" another part, this includes not only the case where it is "on" another part but also the case where there is another part in between. Conversely, when a part of a layer, film, region, plate, etc. is said to be "under" another part, this includes not only cases where it is "directly under" another part but also a case where another part is in the middle.

Unless otherwise specified, all numbers, values, and/or expressions expressing quantities of ingredients, reaction conditions, polymer compositions, and formulations used herein contain all numbers, values and/or expressions in which such numbers essentially occur in obtaining such values, among others. Since they are approximations reflecting various uncertainties in the measurement, it should be understood as being modified by the term "about" in all cases. In addition, when a numerical range is disclosed in this disclosure, this range is continuous and includes all values from the minimum to the maximum value containing the maximum value of this range unless otherwise indicated. Furthermore, when such a range refers to an integer, all integers, including the minimum value to the maximum value containing the maximum value, are included unless otherwise indicated.

Figure 1:
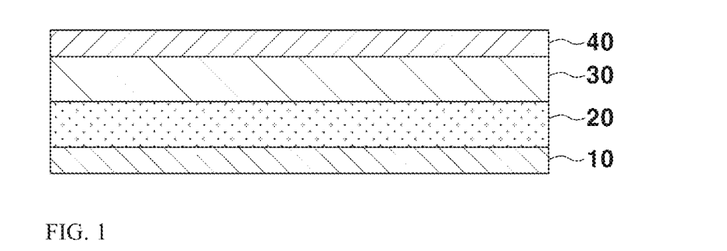
FIG. 1 shows an all-solid-state battery according to an exemplary embodiment of the present disclosure.

FIG. 1 shows an all-solid-state battery according to an exemplary embodiment of the present disclosure. The all-solid-state battery may include an anode 10, a solid electrolyte layer 20 disposed on the anode 10, a cathode active material layer 30 disposed on the solid electrolyte layer 20, and the cathode current collector 40 disposed on the cathode active material layer 30.

Figure 2:
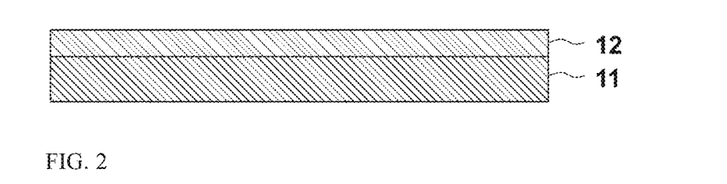
FIG. 2 shows an anode according to an exemplary embodiment of the present disclosure.

FIG. 2 shows the anode according to an exemplary embodiment of the present disclosure. The anode 10 may include an anode current collector 11, and a coating layer 12 disposed on the anode current collector.

The cathode current collector 40 may be a plate-shaped, sheet-shaped, or thin substrate composed of a conductive material. The cathode current collector 40 may include aluminum (Al), stainless steel (SUS), or the like.

The cathode active material layer 30 may include a cathode active material, a solid electrolyte, a conductive material, a binder, and the like.

The cathode active material may include an oxide active material or a sulfide active material.

The oxide active material may include a rock salt layer type active material such as $LiCoO_2$, $LiMnO_2$, $LiNiO_2$, $LiVO_2$, $Li_{1+x}Ni_{1/3}Co_{1/3}Mn_{1/3}O_2$, etc., a spinel type active material such as $LiMn_2O_4$, $Li(Ni_{0.5}Mn_{1/3})O_4$, a reverse spinel type active material such as $LiNiVO_4$ and $LiCoVO_4$, an olivine type active material such as $LiFePO_4$, $LiMnPO_4$, $LiCoPO_4$, $LiNiPO_4$, silicon-containing active material such as $Li_2FeSiO_4$, $Li_2MnSiO_4$, a rock salt layer type active material in which a part of the transition metal is substituted with a dissimilar metal such as $LiNi_{0.8}Co_{(0.2-x)}Al_x$ (0<x<0.2), a spinel type active material in which a part of the transition metal is substituted with a dissimilar metal such as $Li_{1+x}Mn_{2-x-y}M_yO_4$ (M is at least one of Al, Mg, Co, Fe, Ni, Zn, and 0<x+y<2), and a lithium titanate such as $Li_4Ti_5O_{12}$, or the like.

The sulfide active material may include copper Chevrel, iron sulfide, cobalt sulfide, nickel sulfide, or the like.

The solid electrolyte may include an oxide solid electrolyte or a sulfide solid electrolyte. However, the solid electrolyte may be preferable to use a sulfide-based solid electrolyte having high lithium ion conductivity. The sulfide-based solid electrolyte is not particularly limited but may include $Li_2S-P_2S_5$, $Li_2S-P_2S_5-LiI$, $Li_2S-P_2S_5-LiCl$, $Li_2S-P_2S_5-LiBr$, $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (where m and n are positive numbers, and Z is one of Ge, Zn, and Ga), $Li_2S-GeS_2$, $Li_2S-SiS_2-Li_3PO_4$, $Li_2S-SiS_2-Li_xMO_y$ (where x and y are positive numbers, M is one of P, Si, Ge, B, Al, Ga, In), $Li_{10}GeP_2S_{12}$, and the like.

The conductive material may include carbon black, conducting graphite, ethylene black, graphene, or the like.

The binder may include butadiene rubber (BR), nitrile butadiene rubber (NBR), hydrogenated nitrile butadiene rubber (HNBR), polyvinylidene difluoride (PVDF), polytetrafluoroethylene (PTFE), carboxymethylcellulose (CMC), or the like.

The solid electrolyte layer 20 is interposed between the cathode active material layer 30 and the anode 10 to conduct lithium ions between both components.

The solid electrolyte layer 20 may include an oxide-based or a sulfide-based solid electrolyte. However, the solid electrolyte may be preferable to use a sulfide-based solid electrolyte having high lithium ion conductivity. The sulfide-based solid electrolyte is not particularly limited but may include $Li_2S-P_2S_5$, $Li_2S-P_2S_5-LiI$, $Li_2S-P_2S_5-LiCl$, $Li_2S-P_2S_5-LiBr$, $Li_2S-P_2S_5-Li_2O$, $Li_2S-P_2S_5-Li_2O-LiI$, $Li_2S-SiS_5$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (where m and n are positive numbers, and Z is one of Ge, Zn, and Ga), $Li_2S-GeS_2$, $Li_2S-SiS_2-Li_3PO_4$, $Li_2S-SiS_2-Li_xMO_y$ (where x and y are positive numbers, M is one of P, Si, Ge, B, Al, Ga, In), $Li_{10}GeP_2S_{12}$, and the like.

Figure 3:
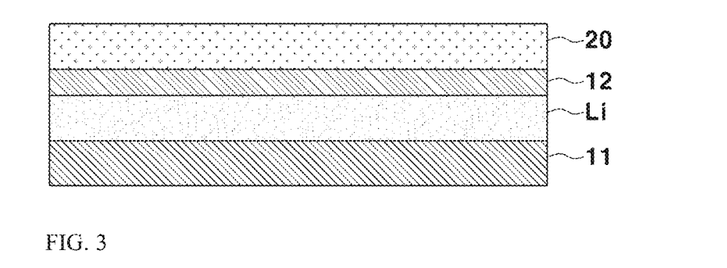
FIG. 3 shows a reference diagram for explaining the state of charge of the all-solid-state battery according to an exemplary embodiment of the present disclosure.

According to an exemplary embodiment of the present disclosure, the all-solid-state battery may include the anode 10 that does not include any anode active material layer. That is, the all-solid-state battery may be a kind of anode-free system. FIG. 3 shows a reference diagram for explaining the state of charge of the all-solid-state battery according to an exemplary embodiment of the present disclosure. The all-solid-state battery may store lithium ions coming from the cathode active material layer in the form of lithium metal (Li) at the interface between the anode current collector 11 and the coating layer 12 during charging.

The anode current collector 11 may be a plate-shaped, sheet-shaped, or thin substrate composed of a conductive material. The material constituting the anode current collector 11 is not particularly limited but may include, for example, copper (Cu), nickel (Ni), stainless steel (SUS), or the like.

The anode current collector 11 may have a thickness of about 0.1 μm to 10 μm.

The coating layer 12 may include a carbon material and a metal capable of alloying with lithium.

The carbon material may include amorphous carbon. The amorphous carbon is not particularly limited but may include at least one selected from the group consisting of furnace black, acetylene black, Ketjen black, graphene, and a combination thereof.

The metal capable of alloying the lithium may include at least one selected from the group consisting of silver (Ag), magnesium (Mg), aluminum (Al), gallium (Ga), zinc (Zn), bismuth (Bi), tin (Sn), indium (In), antimony (Sb), lead (Pb), silicon (Si), germanium (Ge), and a combination thereof.

The method for manufacturing the anode 10 according to an exemplary embodiment of the present disclosure may include: preparing the anode 10 including the anode current collector 11 and the coating layer 12 disposed on the anode current collector 11 and including the carbon material; and immersing the anode in a pre-lithiation solution.

As described above, the anode current collector and the coating layer will be omitted below.

The present disclosure is characterized in that the anode 10 is easily prelithiated by preparing a pre-lithiation solution including a pre-lithiation compound with high reducibility and immersing the anode 10 therein.

The pre-lithiated solution may be prepared by adding a pre-lithiated compound to a solvent.

The solvent may include at least one solvent selected from the group consisting of dimethyl ether (DME), 2-methyl tetrahydrofuran, tetrahydropyranyl, and a combination thereof.

The pre-lithiated compound may include lithium and a biphenyl-based compound.

The biphenyl-based compound may include one represented by the following Formula 1.

[Formula 1]

In Formula 1, R1 to R10 may each include an alkyl group having 1 to 3 of carbon atoms.

In the solvent, the lithium and the biphenyl-based compound may be converted as follows to form a high reducibility solution.

[Reaction formula 1]

The anode may be prelithiated by immersing the anode in the pre-lithiation solution at a temperature of about 25° C. to 60° C. for about 1 second to 60 minutes.

The degree of the pre-lithiation is not particularly limited, but the lithium doping amount may be set to be about 30% or less compared to the full charge of the anode. For example, the pre-lithiation may be performed so that the lithium doping amount is 1 mAh/cm² or less.

The method of manufacturing the anode may further include immersing the prelithiated anode in a stabilizing solution. This is to prevent side reactions between the anode and other components by stabilizing the surface of the prelithiated anode.

The stabilizing solution may include at least one selected from the group consisting of fluoroethylene carbonate (FEC), vinylene carbonate (VC), vinyl ethylene carbonate (VEC), methyl vinylene carbonate (meVC), ethylene carbonate (EC), and a combination thereof.

A film may be formed on the anode by immersing the anode in a stabilizing solution.

The film may be a kind of solid electrolyte interface layer.

The composition of the coating film may vary depending on the type of the stabilizing solution but may include a compound having a C—O bond, a C=O bond, and an R—CO—R' bond.

The film may have a thickness of about 200 nm or less.

The anode may be immersed in the stabilizing solution for about 10 to 60 minutes.

Hereinafter, another form of the present disclosure will be described in more detail through the following examples. The following examples are merely illustrative to help the understanding of the present disclosure, and the scope of the present disclosure is not limited thereto.

Examples 1 to 3 and Comparative Example 1

A nickel thin film having a thickness of about 10 μm was prepared as an anode current collector. An anode was prepared by forming a coating layer on the anode current collector to have a thickness of about 8 μm, including Super C65 as a carbon material, silver (Ag) as a metal capable of alloying with lithium, and polyvinylidene fluoride (PVDF) as a binder.

The anode was prelithiated by immersing the anode in a pre-lithiation solution. The immersion conditions of each Example are as follows.

Example 1: 50° C. and 15 minutes
Example 2: 60° C. and 15 minutes
Example 3: 60° C. and 30 minutes The pre-lithiation solution was prepared by adding a pre-lithiation compound including lithium and biphenyl in a molar ratio of 4:1 to a concentration of about 0.5 M in a mixed solvent of 2-methyl tetrahydrofuran and tetrahydropyranyl.

Comparative Example 1 was set as an anode without pre-lithiation.

The following experiment was performed by manufacturing a coin cell with each anode. In this case, 1.0 M LiPF$_6$ in EC/DEC (1:1 v/v)+10 vol % FEC was used as the electrolyte.

Figure 4:
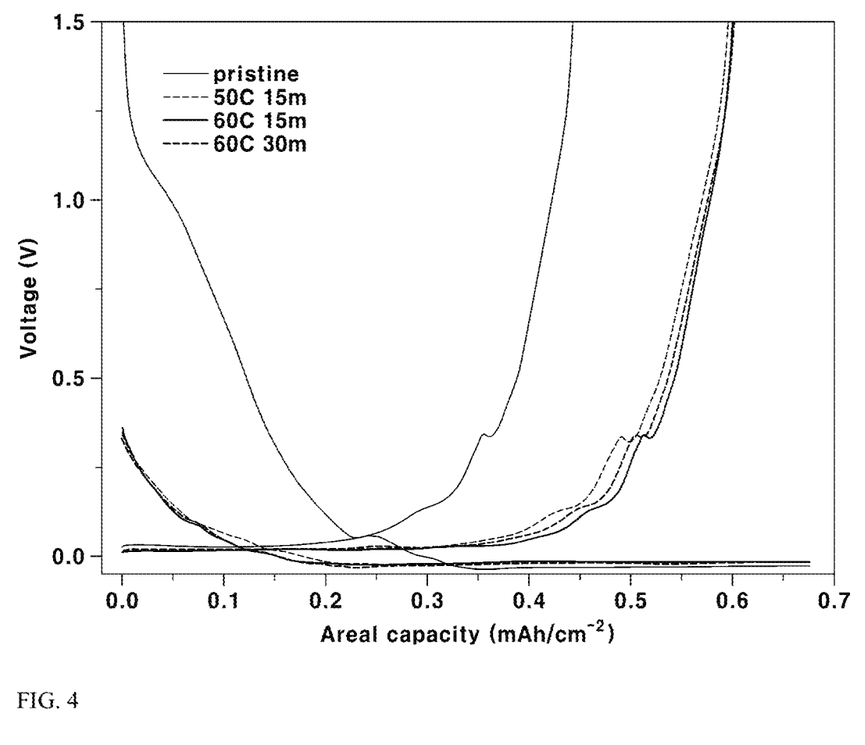
FIG. 4 shows initial efficiency of the anode of Examples 1 to 3 and Comparative Example 1.

FIG. 4 shows initial efficiency of the anode of Examples 1 to 3 and Comparative Example 1. In FIG. 4, pristine means Comparative Example 1, 50° C. 15 minutes means Example 1, 60° C. 15 minutes means Example 2, and 60° C. 30 minutes means Example 3.

Table 1 below summarizes the initial efficiencies of each anode based on the results of FIG. 4.

TABLE 1

| Division | <Comparative Example 1> | <Example 1> | <Example 2> | <Example 3> |
|---|---|---|---|---|
| Initial OCV (V vs. Li/Li⁺) | 1.96 V | 0.36 V | 0.36 V | 0.33 V |
| Initial efficiency (%) | 65.6 | 88.2 | 89.0 | 89.0 |

Referring to this Table 1, it can be seen that the initial efficiency of the anode can be greatly increased through pre-lithiation.

Figure 5A:
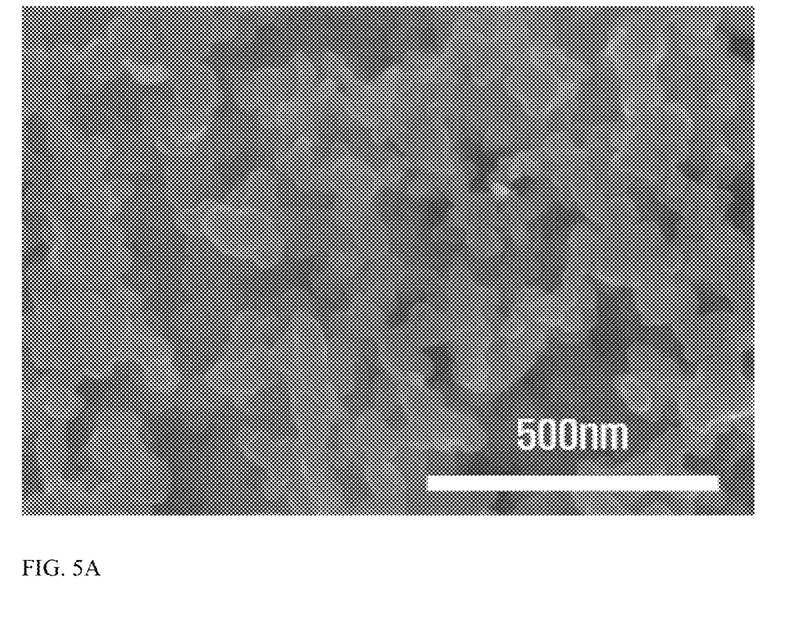
FIG. 5A shows the anode according to Example 3 before doping with lithium analyzed by a scanning electron microscope.
Figure 5B:
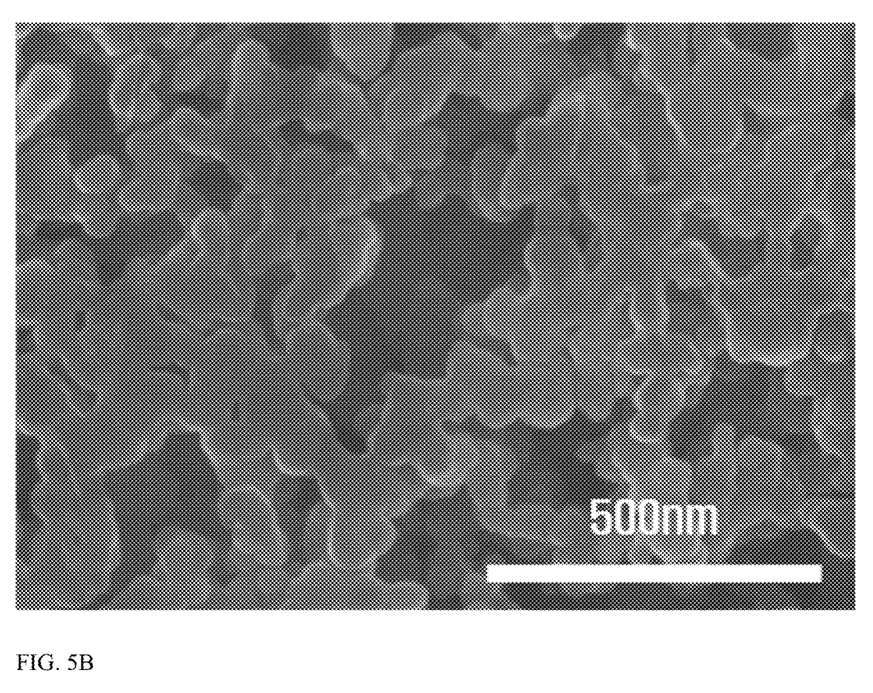
FIG. 5B shows the anode according to Example 3 after doping with lithium analyzed by a scanning electron microscope.

FIG. 5A shows the anode according to Example 3 before pre-lithiation analyzed by a scanning electron microscope. FIG. 5B shows the anode according to Example 3 after pre-lithiation analyzed by a scanning electron microscope.

Table 2 below shows the lithium desorption capacity of the anode and the coulombic efficiency of the second charging cycle.

TABLE 2

| Division | <Example 3> |
|---|---|
| Lithium desorption capacity (mAh/cm²) | 0.036 |
| Coulombic efficiency of 2nd charging Cycle (%) | 81.8 |

It can be seen that the anode is doped with lithium through the increase in the particle size of FIG. 5B compared to FIG. 5A and the expression of the charging capacity as shown in Table 2.

Examples 4 to 6

The anode, according to Example 3, was immersed in fluoroethylene carbonate (FEC) as a stabilizing solution for 10 minutes (Example 4), 30 minutes (Example 5), and 60 minutes (Example 6), respectively.

Figure 6:
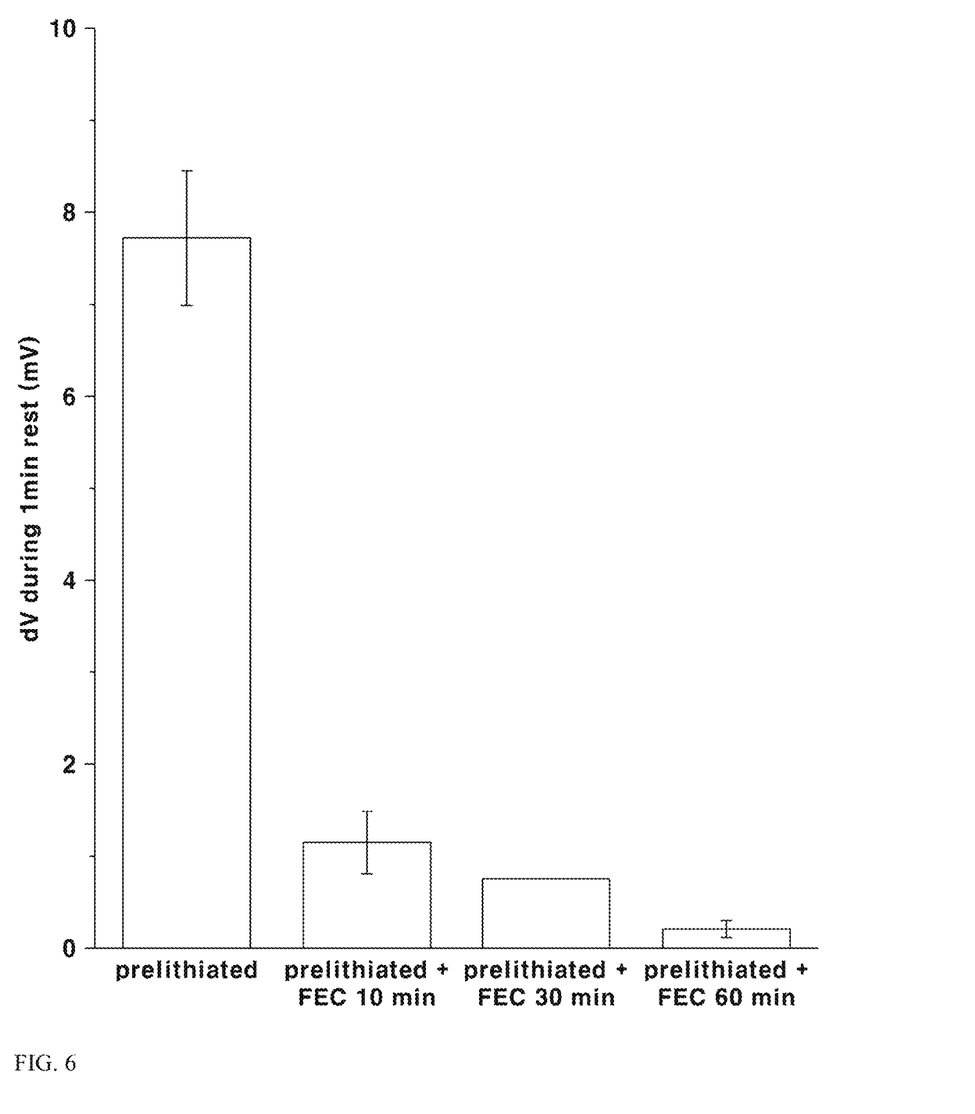
FIG. 6 shows OCV change width of the anode according to Examples 3 to 6.

FIG. 6 shows OCV change width of the anode according to Examples 3 to 6. In FIG. 6, prelithiated is a result of Example 3, prelithiated+FEC 10 minutes is a result of Example 4, prelithiated+FEC 30 minutes is a result of Example 5, and prelithiated+FEC 60 minutes is a result of Example 6.

Referring to FIG. 6, it can be seen that as the immersion time for the stabilizing solution is increased, the change width of the open circuit voltage (OCV) is significantly reduced. Since the change in OCV means a side reaction with the electrolyte, it can be seen that the anode treated with the stabilizing solution is stable because the reactivity to the electrolyte is greatly reduced.

For the anode, according to Example 3 and Example 4, the OCV change was observed for 60 minutes, and the initial efficiency was measured. The results are shown in Table 3 below.

TABLE 3

| Division | <Example 3> | <Example 4> |
|---|---|---|
| OCV increase in 60 min. (mV) | 175 | 32 |
| $1^{st}$ CE (%) | 90.3 | 90.6 |

In Example 4, a stabilizing film was formed on the anode, and the OCV change was reduced by about 20% compared to Example 3, and the initial efficiency was maintained similarly so that the lithium doping effect was preserved.

On the other hand, a small change in OCV means that a stable film was formed, and the same $1^{st}$ CE means that it is electrochemically equivalent. That is, it can be understood that Example 4 obtained both the effects of pre-lithiation and stable film formation.

Figure 7:
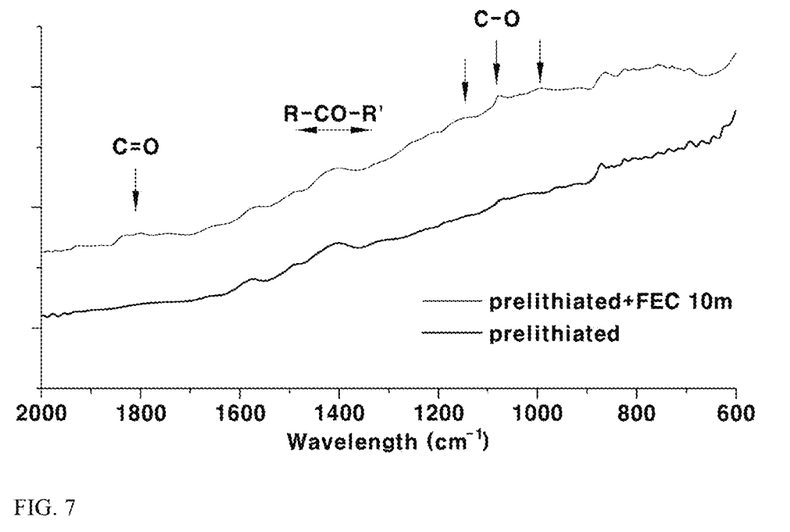
FIG. 7 shows the surface of the anode according to Examples 3 and 4 analyzed by Fourier transform infrared spectrometer (FTIR)

FIG. 7 shows the surface of the anode according to Examples 3 and 4 analyzed by Fourier transform infrared spectrometer (FTIR). In FIG. 7, prelithiated is a result of Example 3, and prelithiated+FEC 10 minutes is a result of Example 4. Referring to FIG. 7, it can be seen that a film including a compound having a C—O bond, a C=O bond, and an R—CO—R' bond was formed on the electrode surface of Example 4 treated with the stabilizing solution.

Figure 8:
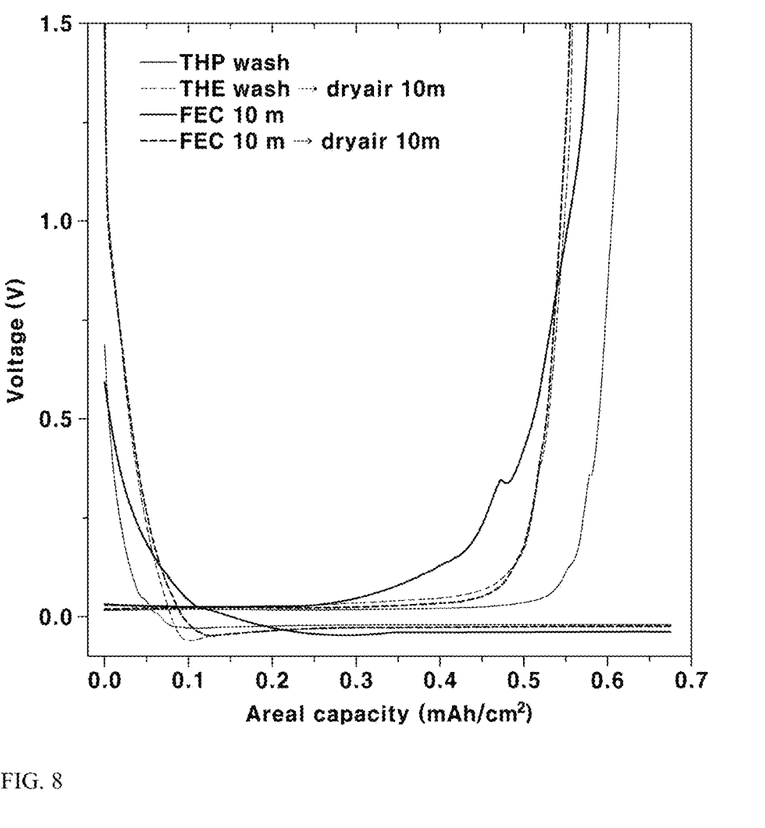
FIG. 8 shows the degree of decrease in initial efficiency when the anode according to Examples 3 and 4 is exposed to a dry atmosphere.

FIG. 8 shows the degree of decrease in initial efficiency when the anode, according to Examples 3 and 4, is exposed to a dry atmosphere. The exposure time was set to about 10 minutes. The results are summarized in Table 4 below.

TABLE 4

| Atmospheric exposure | None | | 10 minutes to dry air | |
|---|---|---|---|---|
| Division | <Example 3> | <Example 4> | <Example 3> | <Example 4> |
| $1^{st}$ CE (%) | 91.1 | 88.0 | 82.7 | 82.3 |

Referring to this Table 4, in Example 3, when exposed to drying air for 10 minutes, the initial efficiency decreases by about 8.4%, whereas in Example 4, the degree of decrease is small to about 5.7%. Through this, it can be seen that the decrease in initial efficiency can be reduced through surface stabilization of the anode.

Example 7 and Comparative Example 2

All-solid-state batteries, according to Example 7 and Comparative Example 2, were prepared using the anode according to Example 4 and Comparative Example 1, respectively. A sulfide-based solid electrolyte was used as the electrolyte.

Figure 9:
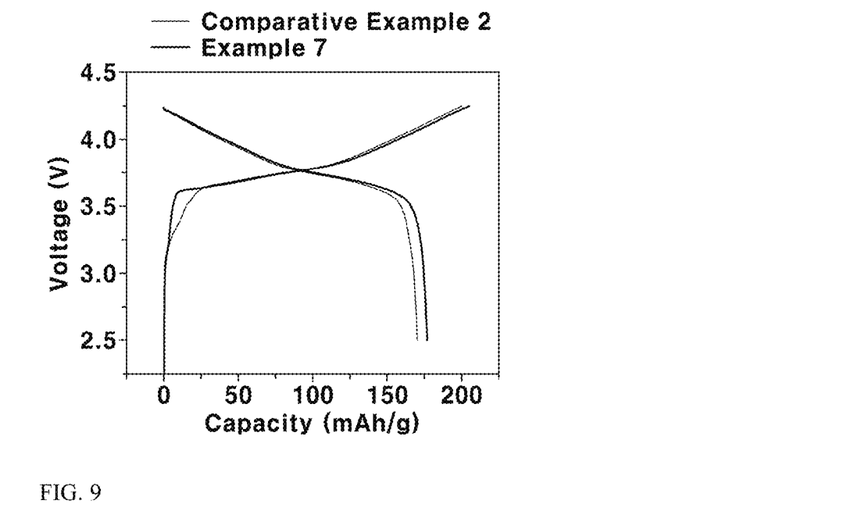
FIG. 9 shows charge and discharge characteristics of the all-solid-state battery according to Example 7 and Comparative Example 2.

FIG. 9 shows the charge and discharge characteristics of the all-solid-state battery according to Example 7 and Comparative Example 2. The results are summarized in Table 5 below.

TABLE 5

| Division | First coulombic efficiency (%) | Unit charge capacity (mAh $g^{-1}$) | Unit discharge capacity (mAh $g^{-1}$) |
|---|---|---|---|
| <Comparative Example 2> | 85.1 | 200.0 | 170.3 |
| <Example 7> | 86.3 | 205.1 | 177.1 |

Referring to this Table 5, it can be seen that Example 7 is superior to Comparative Example 2 in all of the first coulombic efficiency, unit charge capacity, and unit discharge capacity.

The foregoing descriptions of specific exemplary embodiments of the present invention have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present invention, as well as various alternatives and modifications thereof. It is intended that the scope of the present disclosure be defined by the Claims appended hereto and their equivalents.

What is claimed is:

1. A method of manufacturing an anode for a lithium secondary battery, the method comprising:
    preparing an anode comprising an anode current collector, and a coating layer disposed on the anode current collector and comprising a carbon material;
    doping lithium into the anode by simply immersing the anode in a pre-lithiation solution; and
    immersing the anode in a stabilizing solution,
    wherein the pre-lithiation solution comprises a pre-lithiated compound comprising lithium and a biphenyl-based compound,
    wherein the stabilizing solution comprises at least one of fluoroethylene carbonate (FEC), vinylene carbonate (VC), vinyl ethylene carbonate (VEC), methyl vinylene carbonate (meVC), ethylene carbonate (EC), or any combination thereof, and
    wherein a lithium doping amount of the anode is about 1 mAh/cm$^2$ or less.

2. The method of claim 1, wherein the coating layer comprises the carbon material and a metal capable of alloying with the lithium.

3. The method of claim 2, wherein the metal capable of alloying with the lithium comprises at least one of silver (Ag), magnesium (Mg), aluminum (Al), gallium (Ga), zinc (Zn), bismuth (Bi), tin (Sn), indium (In), antimony (Sb), lead (Pb), silicon (Si), germanium (Ge), or any combination thereof.

4. The method of claim 1, wherein a concentration of the pre-lithiation compound is about 0.1 M to 1 M.

5. The method of claim 1, wherein a molar ratio of the lithium and the biphenyl-based compound is about 0.5:1 to 6:1.

6. The method of claim 1, wherein the biphenyl-based compound is represented by the following Formula 1,

[Formula 1]

wherein, in Formula 1, R1 to R10 each comprises an alkyl group having 1 to 3 of carbon atoms.

7. The method of claim 1,
wherein the pre-lithiation solution further comprises a solvent, and
wherein the solvent comprises at least one of dimethyl ether (DME), 2-methyl tetrahydrofuran, tetrahydropyranyl, or any combination thereof.

8. The method of claim 1, wherein the anode is immersed in the pre-lithiation solution at a temperature of about 25° C. to 60° C. for about 10 seconds to 30 minutes.

9. The method of claim 1, wherein the anode is immersed in the stabilizing solution to form a film on the anode, and the film comprises a C—O bond, a C=O bond, and an R—CO—R' bond.

10. The method of claim 9, wherein a thickness of the film is about 200 nm or less.

11. The method of claim 1, wherein the anode is immersed in the stabilizing solution for about 10 to 60 minutes.

12. An anode manufactured by the method according to claim 1 for a lithium secondary battery, the anode comprising:
an anode current collector; and
a coating layer disposed on the anode current collector.

13. The anode of claim 12, wherein the coating layer comprises a carbon material and a metal capable of alloying with lithium.

14. The anode of claim 13, wherein the metal capable of alloying with the lithium comprises at least one of silver (Ag), magnesium (Mg), aluminum (Al), gallium (Ga), zinc (Zn), bismuth (Bi), tin (Sn), indium (In), antimony (Sb), lead (Pb), silicon (Si), germanium (Ge), or any combination thereof.

* * * * *